No. 708,674. Patented Sept. 9, 1902.
J. W. STEVENS.
CORN PLANTER AND FERTILIZER DISTRIBUTER.
(Application filed Dec. 12, 1901.)
(No Model.) 2 Sheets—Sheet 1.
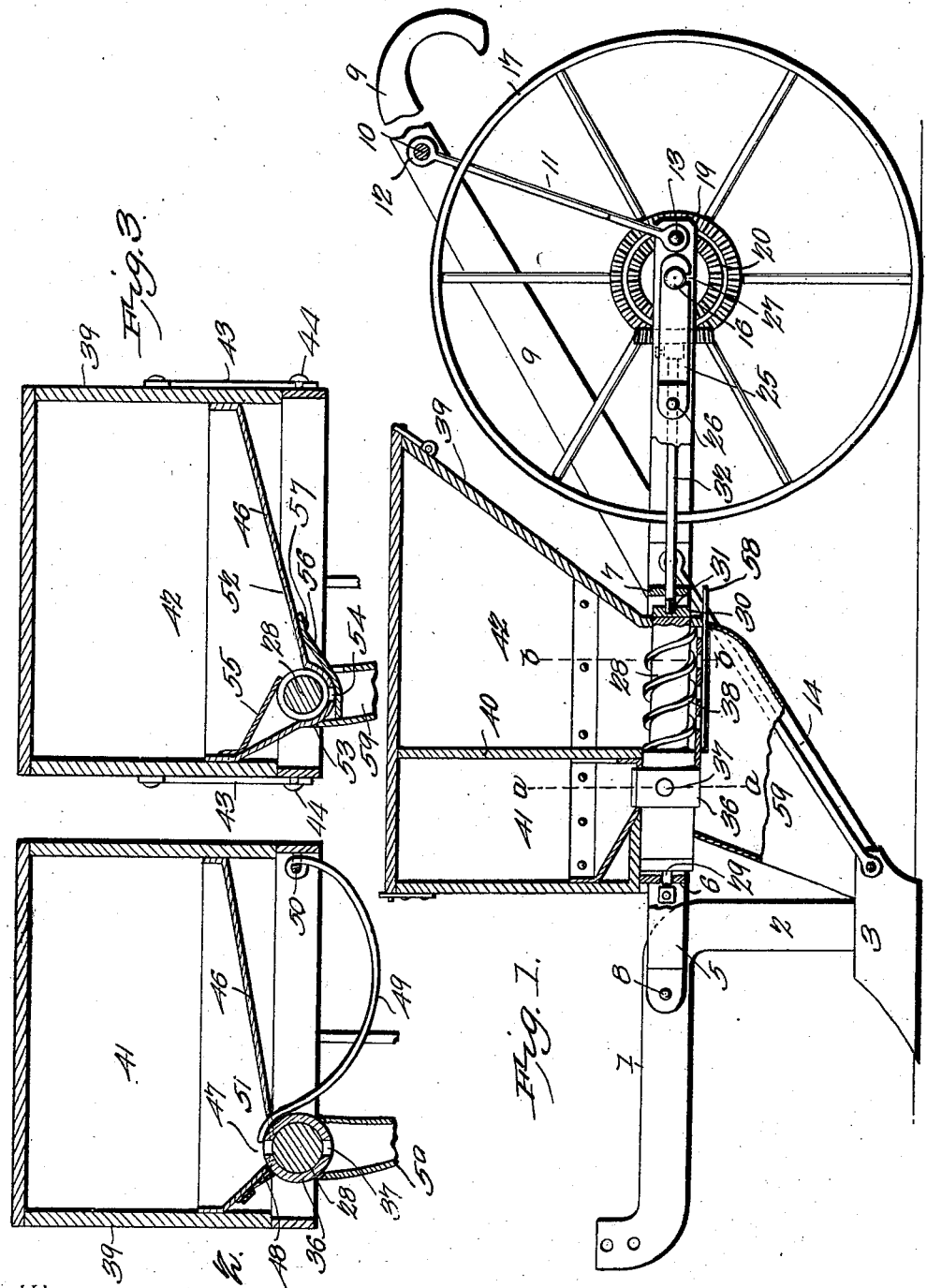

No. 708,674. Patented Sept. 9, 1902.
J. W. STEVENS.
CORN PLANTER AND FERTILIZER DISTRIBUTER.
(Application filed Dec. 12, 1901.)
(No Model.) 2 Sheets—Sheet 2.
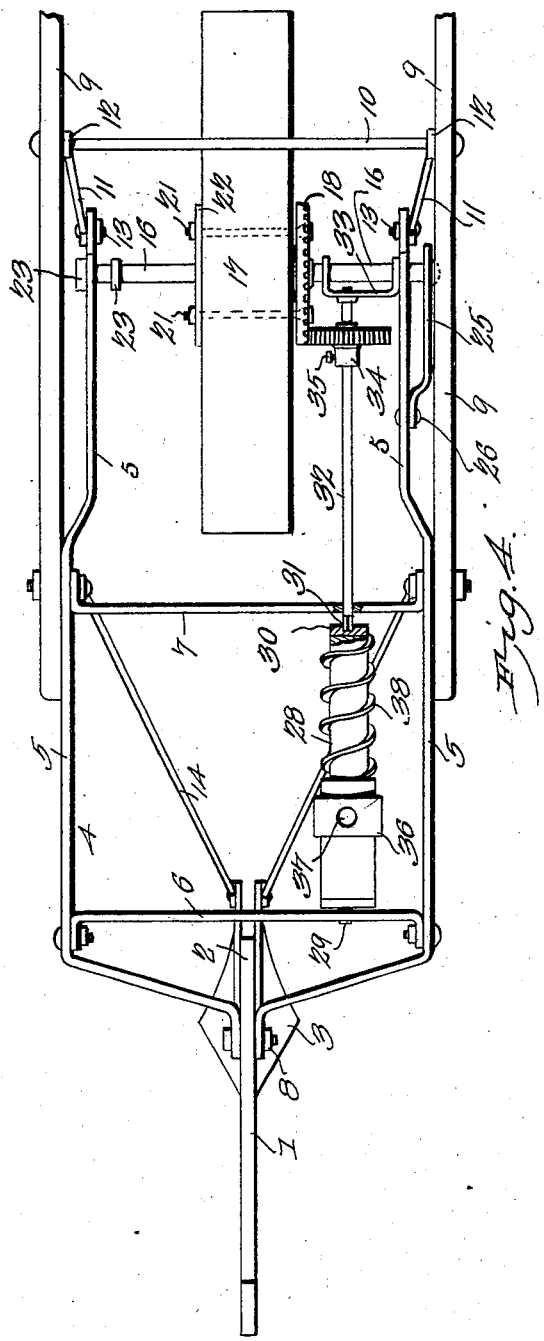
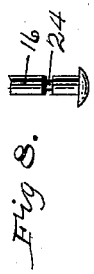
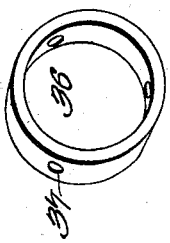
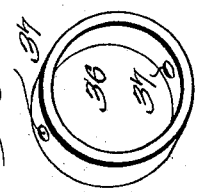
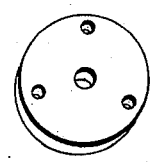
Witnesses J. W. Stevens, Inventor.
by Attorneys

UNITED STATES PATENT OFFICE.

JOHN W. STEVENS, OF LONEGUM, VIRGINIA.

CORN-PLANTER AND FERTILIZER-DISTRIBUTER.

SPECIFICATION forming part of Letters Patent No. 708,674, dated September 9, 1902.

Application filed December 12, 1901. Serial No. 85,681. (No model.)

*To all whom it may concern:*

Be it known that I, JOHN W. STEVENS, a citizen of the United States, residing at Lonegum, in the county of Bedford and State of Virginia, have invented a new and useful Corn-Planter and Fertilizer-Distributer, of which the following is a specification.

My invention is an improved corn and other seed planter and fertilizer-distributer; and it consists in the peculiar construction and combination of devices hereinafter fully set forth and claimed.

In the accompanying drawings, Figure 1 is partly a side elevation and partly a vertical sectional view of a combined planter and fertilizer-distributer embodying my improvements. Fig. 2 is a detail vertical transverse sectional view of the same, taken on a plane indicated by the line *a a* of Fig. 1. Fig. 3 is a similar view taken on a plane indicated by the line *b b* of Fig. 1. Fig. 4 is a top plan view of the same with the hopper removed. Figs. 5 and 6 are detailed perspective views of the interchangeable seed-rings. Fig. 7 is a similar view of the plate which is secured on one side of the traction and supporting wheel. Fig. 8 is a detail view of the shaft 16.

In the embodiment of my invention I provide a draft-bar 1, the rear end of which is turned downwardly to form a standard 2, to the lower end of which is secured a furrow-opener 3, which is preferably of the form here shown, with rearwardly-diverging sides.

The frame 4 comprises a pair of side bars 5 and a pair of cross-bars 6 7, the ends of which are turned at right angles in opposite directions and are bolted to the inner sides of the bars 5, the cross-bar 6 being secured near the front ends of the side bars 5 and the cross-bar 7 being secured at a suitable distance in rear of the cross-bar 6. The front ends of the bars 5 converge forwardly and are bolted on opposite sides of the draft-bar 1, as at 8. A pair of handles 9 have their front portions bolted to the side bars of the frame. The said handles are connected together near their rear ends by a cross-bar 10 and are braced by brace-bars 11, which have eyes 12 at their upper ends through which the cross-bar 10 extends and have their lower ends bolted to the side bars 5, near the rear ends of the latter, as at 13. Brace-bars 14 have their lower ends bolted to the rearwardly-diverging side wings of the furrow-opener and their rear ends bolted to the inner sides of the side bars 5, as shown.

An endwise-shiftable shaft or axle 16 has its bearings in the side bars 5, near the rear ends thereof. On the said shiftable shaft 16 is secured a traction and supporting wheel 17, which runs in the furrow made by the furrow-opener, and to one side of which, at its center, is secured a gear-wheel 18, which is provided with two or more concentric series of spurs 19 20 on one side. As here shown, the said gear-wheel 18 is connected to the wheel 17 by bolts 21, which pass through alined openings in said gear-wheel, traction-wheel, and in a plate 22, which is on the side of the wheel 17 opposite the gear-wheel 18. The said shaft 16 is provided at one end with collars or other suitable stops 23, which are on opposite sides of one of the side bars 5. The opposite end of the said shaft 16 projects beyond the outer side of the other side bar 5 and is provided with an annular groove 24. A lock-strap 25 is pivotally attached to one of the side bars 5, as at 26, and has a notch 27 in its under side, near its rear free end, which notch is adapted to engage the annular groove 24 of shaft 16 to lock the latter against endwise movement when in one position. When the said lock-strap is disengaged from the said annular groove, the shaft 16 may be moved endwise a slight distance, thereby moving the wheel 17 laterally, and the lock-strap may be then lowered and caused to bear on the projecting end of the said shaft 16 to lock the latter when thus shifted.

A longitudinally-disposed roller 28 is provided at its front end with a trunnion 29, which is adapted to be journaled in a bearing with which the cross-bar 6 is provided. The rear end of the said roller is provided with a circular plate 30, which may be secured thereto by screws or other suitable means. The said plate and the trunnion of the roller are of iron or steel and the roller is preferably of wood, but may be made of any other suitable material. The plate 30, which forms the rear end of the roller, has an angular central opening 31. The longitudinally-disposed shaft 32 has an angular projection at its front end, which is adapted to engage said angular opening 31. The said shaft is journaled in a bearing in the cross-bar 7, which supports the front end of said shaft, and the rear end of the latter is journaled in a bearing 33, which is here shown as being in the form substantially of the letter U, with one of its arms secured to one of the side bars 5 and having openings in its arms in which the shaft 16 rotates and is shiftable. An adjustable pinion 34 is secured on the shaft 32 by a set-screw 35 or other suitable means, and the said pinion may be so adjusted on the shaft 32 as to mesh with either of the concentric series of spurs on the proximate side of the gear-wheel 18. Hence the shaft 32, and consequently the roller 28, may be caused to rotate at any desired rate of speed. By securing the shiftable shaft 16 in place when the pinion 35 is engaged with the gear 18 said roller 28 is rotated by the power of the wheel 17. By shifting said shaft so that the gear 18 is disengaged from the pinion 34 it will be understood that the roller 28 will be thrown out of gear and will not operate when the machine is in motion.

On the front portion of the roller 28 is a seed-ring 36. In practice several of the said seed-rings will be provided with each of the machines and the said seed-rings are interchangeable on the roller. Each of the said rings 36 is provided with a series of openings 37, which constitute the seed-cups, and the number of the said cups varies on the respective interchangeable rings. The rear portion of the roller 28 is provided on its periphery with a feed-worm 38, which in practice may be formed by disposing a suitable iron rod spirally on the roller and securing the same thereto.

The hopper 39 is divided by a transversely-disposed partition-board 40 into a front seed-compartment 41 and a rear fertilizer-compartment 42. The said hopper is supported on the side bars 5 by supporting-straps 43, which have their upper ends pivoted to the sides of the hopper and their lower ends provided with notches, which engage headed projections 44 on the said side bars 5. The front end of the hopper bears on the cross-bar 6. The bottom 46 of the seed-compartment of the hopper inclines in opposite directions and is provided with an opening 47, which receives the upper side of the ring 36. A cut-off brush 48, secured under the bottom 46, bears against one side of the seed-ring. A cut-off 49, which is preferably of the form shown in Fig. 2, is pivoted at its outer end to the frame, as at 50, and at its inner end bears on the upper side of the seed-ring and extends through one side of the opening 47 in the bottom of the seed-compartment of the hopper, as shown at 51.

The bottom 52 of the fertilizer-compartment of the hopper is inclined in opposite directions and is formed with a depending longitudinally-disposed trough 53, in which the feed-worm 38 operates, the said trough having discharge-openings 54 in its lower side under the feed-worm. A deflecting-plate 55, which forms a partial false bottom of the fertilizer-compartment, bears on the upper side of the feed-worm and relieves the latter of the weight of the superincumbent mass of fertilizer, hence relieving the feed-worm of excessive friction. A cut-off plate 56 is disposed under the bottom of the fertilizer-compartment of the hopper, is pivoted at one of its front corners thereto, as at 57, and its rear end 58 projects rearwardly of the hopper and forms a handle by which the said cut-off plate may be operated. The said cut-off plate, as will be understood, serves to open the fertilizer discharge-openings 54 to any desired extent or to entirely close them at will. A spout 59, which receives the seeds dropped from the seed-cups by the rotation of the roller and the fertilizer discharged through the openings 54 by the rotation of the worm, is disposed between the braces 14, which connect the furrow-opener to the side bars of the frame and has its lower end secured between the rearwardly-diverging wings or sides of the furrow-opener.

Having thus described my invention, I claim—

1. In a planter, a frame having bearings, a hopper on said frame, a roller coacting with the hopper to discharge material therefrom, said roller having a trunnion at one end journaled in one of said bearings and having a socket in its opposite end, a longitudinally-movable shaft 32, journaled in the other bearings and having one end detachably connected to said socket, a traction-wheel, a gear revolved thereby and a gear on said shaft 32 and engaging said first-mentioned gear, substantially as described.

2. In a planter, the combination of a frame, a hopper, a removable element, coacting therewith to discharge material therefrom, said element having a projecting shaft, a shiftable pinion on said shaft, a longitudinally-shiftable shaft 16, disposed transversely with reference to and journaled in bearings in the frame, a traction-wheel and a gear, rotated thereby and adapted to be moved into and out of engagement with the pinion by shifting said shaft 16, said gear having concentric series of gear elements to respectively engage said pinion and thereby vary the speed of said revoluble element and means to lock said shaft 16 when shifted, substantially as described.

3. In a planter, the combination of a frame, a hopper detachably secured thereto, a revoluble roller having one end journaled in a bearing in the frame, a shaft, detachably connected to the opposite end of said roller, bearings for said shaft, a traction-wheel, and means to convey power therefrom to said shaft, substantially as described.

In testimony that I claim the foregoing as my own I have hereto affixed my signature in the presence of two witnesses.

JOHN W. STEVENS.

Witnesses:
O. C. RUCKER,
W. A. FITZPATRICK.